(12) United States Patent
Lyons

(10) Patent No.: US 6,226,440 B1
(45) Date of Patent: May 1, 2001

(54) OPTICAL COUPLER AND ILLUMINATION SYSTEM EMPLOYING THE SAME

(75) Inventor: Harold W. Lyons, Edgewater, FL (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 08/995,636

(22) Filed: Dec. 22, 1997

Related U.S. Application Data (63) Continuation-in-part of application No. 08/714,450, filed on Sep. 16, 1996, now Pat. No. 5,725,296.

(51) Int. Cl.[7] .................................................. G02B 6/04
(52) U.S. Cl. ........................................ 385/901; 385/119
(58) Field of Search .................................. 362/559, 560; 385/901, 115, 116, 119; 359/857–860

(56) References Cited

U.S. PATENT DOCUMENTS

| | | | |
|---|---|---|---|
| 624,392 | 5/1899 | Smith | 600/249 |
| 1,519,209 | 12/1924 | McElroy | 362/349 |
| 3,455,622 | 7/1969 | Cooper | 359/359 |
| 3,564,231 | 2/1971 | Bruce et al. | 385/115 |
| 3,717,743 | 2/1973 | Costello | 392/421 |
| 3,721,815 | 3/1973 | Wall | 385/115 |
| 4,037,096 | 7/1977 | Brendgord et al. | 362/294 |
| 4,201,197 * | 5/1980 | Dismer | 126/451 |
| 4,233,493 | 11/1980 | Nath | 606/16 |
| 4,282,527 * | 8/1981 | Winderman et al. | 343/725 |
| 4,460,939 | 7/1984 | Murakami et al. | 362/31 |
| 4,463,410 | 7/1984 | Mori | 362/20 |
| 4,483,585 | 11/1984 | Takami | 385/115 |
| 4,747,030 | 5/1988 | Offner et al. | 362/17 |
| 4,883,333 | 11/1989 | Yanez | 385/33 |
| 4,934,804 * | 6/1990 | Folsom | 350/618 |
| 5,170,454 | 12/1992 | Kanai | 385/88 |
| 5,271,077 | 12/1993 | Brockman et al. | 385/31 |
| 5,335,309 | 8/1994 | Fujii et al. | 362/285 |
| 5,341,445 | 8/1994 | Davenport et al. | 385/39 |
| 5,412,750 | 5/1995 | Nath | 385/901 |
| 5,428,509 | 6/1995 | Dassanayake | 362/348 |
| 5,438,485 | 8/1995 | Li et al. | 385/901 |
| 5,475,571 | 12/1995 | Dassanayake | 362/26 |
| 5,491,765 | 2/1996 | Matsumoto | 385/33 |

* cited by examiner

Primary Examiner—Hung N. Ngo
(74) Attorney, Agent, or Firm—Alix, Yale & Ristas, LLP (57) ABSTRACT

An illumination technique and system employing an optical waveguide to transmit light from a source, typically a light emitter which operates at high temperature, to a light head which creates a desired light dispersion pattern. The light head includes a member which emulates the light source and the emitted light is coupled from the source into the optical waveguide by a compact and efficient columnator comprising a pair of dissimilar three dimensional reflectors and a lens.

21 Claims, 5 Drawing Sheets

OPTICAL COUPLER AND ILLUMINATION SYSTEM EMPLOYING THE SAME

CROSS-REFERENCE TO RELATED APPLICATION

This application is a continuation-in-part of application Ser. No. 08/714,450 filed Sep. 16, 1996, now U.S. Pat. No. 5,725,296.

BACKGROUND OF THE INVENTION

1. Field of the Invention

The present invention relates to the creation of a desired light dispersion pattern using light transmitted via an optical waveguide from a remotely located source to a projection device. More particularly, the present invention relates to the use of a high intensity, high temperature light generator to provide light energy to a remotely located light head and, especially, to the coupling of light generated by such a source into one or more optical fibers for transmission to the light head. Accordingly, the general objects of the present invention are to provide novel and improved methods and apparatus of such character.

2. Description of the Related Art

Attempts to illuminate an area using light generated by a remotely located light source and transmitted to a light head assembly or other luminaire via light guides are known in the art. To date, most light head assemblies designed for use with remote light sources have been mere variations on a single basic design. This basic design contemplates employment of a symmetric concave housing having an aperture within a central region thereof and a light transmissive lens which cooperates with the concave housing to define a chamber therebetween. An optical waveguide, i.e., a fiber or bundle of fibers, extends from the remote light source to the light head and thus transmits the light generated by the remote source to the light head housing. The optical waveguide, commonly referred to as a light pipe, projects through the aperture in the light head housing in a direction which is parallel to the axis of symmetry of the housing and terminates within the chamber of the housing. Since the intensity of the light emitted from the end of a light pipe decreases rapidly as the viewer moves off-axis, i.e., the light emitting end of a light pipe is effectively a very small diameter light source, the prior art has conventionally positioned a lens with a complex pattern of light refracting elements in registration with the discharge end of the light in an attempt to achieve a desired radiation pattern.

The use of a light pipe and remote light source in association with a head assembly offers a number of advantages over light head assemblies with integrated "point" light sources such as gaseous discharge tubes or high intensity incandescent lamps. Among these advantages are the absence of high temperatures and the elimination of the possibility of electric sparks within the light head assembly. The absence of high temperatures within the light head assembly precipitates the additional advantage of allowing the components of the light head to be fabricated from comparatively inexpensive low temperature plastic materials.

However, despite the significant potential benefits offered by light head assemblies designed for use with optical waveguides and remotely located light sources, such assemblies have not found widespread utility due to a number of inherent deficiencies. A major deficiency, as noted above, arises from the fact that a light pipe defines a very small area light source and the intensity of that source decreases rapidly off-axis. For example, in one commercially available optical fiber, approximately ninety percent (90%) of the available light may be measured within twenty-five degrees (25°) of the axis of the light pipe. Thus, the area of a closely spaced surface which will be illuminated by light emitted from a light pipe is far too small to permit, for example, the light pipe to function as a spot or warning light. Accordingly, light head assemblies which employ a light pipe as the source of light must employ some means for dispersing the light transmitted by the light pipe.

Previous attempts to control the dispersion of light emanating from a light pipe have resulted in light head assemblies with serious limitations. A first limitation, as mentioned above, is imposed by the need to employ relatively complex lenses to refract the light emitted from the end of the light pipe. In addition to being expensive, the use of such a lens results in a comparatively high degree of attenuation of the available light. A second limitation of previously available light head assemblies which receive light via an associated light pipe resides in their elongated shape, i.e., their depth in the direction of travel of the light rays. Thus, in an effort to increase the area illuminated, previously available light head assemblies have spaced the emitting end of the light pipe a substantial distance from the refracting lens. While such spacing improves light dispersion, it also results in a volumetrically inefficient device. Light head assemblies employing such elongated housings are impractical for flush mounting on walls or for use where the space behind the supporting wall is severely limited such as, for example, in the case of a dome light in a vehicle. This problem is exacerbated because these prior art light head assemblies receive the light pipe from the rear of the assembly such that the axis thereof, and thus the axis of the emitted light beam, is oriented substantially parallel to the elongated dimension of the light head housing. Since the relatively fragile nature of optical fibers dictates that the light pipe be routed to prevent tight bends, substantial additional depth is required to mount these light head assemblies to a mounting structure. Thus, light head assemblies which employ a light pipe as the light source have found application in only a very limited number of environments.

Another major deficiency, which has previously precluded widespread use of high intensity light sources in combination with light heads, has its origin in the basic difficulty of coupling light into an optical fiber for transmission to the area to be illuminated. High intensity light sources, halogen lamps and HID lamps for example, produce considerable heat. Also, the light generated by such sources is not collumnated. Optical fibers, on the other hand, have a small diameter with a relatively small acceptance angle and are susceptible to thermal damage. Previous attempts to address these characteristics have resulted in highly inefficient coupling, i.e., a large percentage of the available light was not utilized, and/or the resulting systems have had a short service life as a consequence of thermal damage, and/or expensive lenses and/or reflectors and/or filters have been required. Examples of prior art light couplers may be seen from U.S. Pat. Nos. 3,455,622; 3,564,231; 4,233,493; 4,483,585; 4,883,333; 5,170,454; 5,271,077; 5,341,445; 5,428,509 and 5,491,765.

SUMMARY OF THE INVENTION

The present invention overcomes the above-discussed and other deficiencies of the prior art by providing novel and improved methods and apparatus for producing desired illumination patterns by manipulating light generated by a source located remotely from the area to be illuminated. This invention also encompasses novel and improved devices and techniques for efficiently and safely coupling light from a source, and especially a light generator that releases substantial thermal energy during operation, into an optical waveguide for delivery to a light head or the like. Illuminating systems and light couplers in accordance with the invention are characterized by uncomplicated construction, by being economic to manufacture, and by being compact enough to allow installation in a wide variety of environments.

It is, accordingly, a principle object of the present invention to provide a light coupler for focusing light generated by a highly intense light source into an optical waveguide.

It is a further object of the present invention to provide an illumination system which includes a simulated light source, the simulated source deriving energy in the visual spectrum from a remote high intensity light source, such energy being transmitted to a projection device via a light pipe which is efficiently coupled to the light source.

It is yet another object of the present invention to generate a desired light radiation pattern by delivering light generated by a remote hot light source to a unique light head assembly via an efficient coupler and associated light pipe.

The above-enumerated and other objects and advantages of the present invention are, in part, accomplished through the use of a light columnator which directly couples a source of high intensity light to a light pipe or pipes. This columnator utilizes an ellipsoid shaped primary reflector having the source positioned at a first foci thereof. A planar convex lens is displaced from the second foci of the ellipsoid, along the axis thereof, by a distance which is greater than the spacing of the foci. This lens intercepts substantially all of the light focused at the second foci and redirects a large percentage of the intercepted light to the entrance end(s) of the light pipe(s) at angles which are within the acceptance angles of the light pipe(s). The major portion of the remaining light, i.e., light reflected from the primary reflector which impinges on the lens at angles which are too large to enable redirection by the lens into the light pipe(s) pass through the lens and subsequently be redirected by a parabolic secondary reflector such that much of this light will also be incident on the entrance end(s) of the light pipe(s) within the acceptance angle thereof.

The objects of the invention are further in part achieved by a light head assembly having an optic deflector which emulates a conventional light source. The optic deflector redirects, and substantially increases the angle of divergence of, the light emitted from the discharge end of a light pipe. The light thus redirected impinges on a concave main reflector having a reflective surface which faces the deflector. This main reflector thus receives diverging light rays from the optic deflector and redirects the light toward the ambient environment. The optic deflector includes a convex reflective surface shaped to cause the desired illumination of the associated reflector. The deflector is supported at a desired distance from, and with an appropriate orientation with respect to, the discharge end of the light pipe. In one embodiment, the support is provided by a light transmissive lens and the deflector is located between the lens and the discharge end of the light pipe. The deflector is sized to eclipse the light beam emitted from the discharge end of the light pipe, i.e., substantially all of the light directed into the light head is incident on the optic deflector. The concave main reflector of the light head desirably serves as the light head housing and includes a structure for fixedly receiving and orienting the light pipe such that light emitted from the end of the light pipe is intercepted by the deflector. The light reflected from the optic deflector is "focused" by either, or both of, the associated concave reflector and lens to produce the desired radiation pattern.

In a second embodiment of a light head for use in the present invention, an additional reflector is positioned between the discharge end of the light pipe and the reflective surface of the optic deflector. The main reflector of the light head preferably has a concave reflective surface which is symmetric about an axis. Optimally, the additional reflector has a reflective surface which is symmetric about another axis oriented in a direction of about 450° to the axis of symmetry of the main reflector. Such a configuration allows the light pipe to be mounted behind the light head assembly with a substantially perpendicular orientation with respect to the axis of symmetry of the concave main reflector. As with the embodiment discussed above, the deflector may be supported in the desired position and with the desired orientation relative to the end of the light pipe by a light transmissive lens. In this second embodiment, light emitted from the end of the light pipe is directed by the additional reflector to the deflector. The deflector intercepts the light from the additional reflector and redirects it, in a diverging pattern, toward the main reflector. The light is then intercepted by the main reflector and redirected into the ambient environment. Since this embodiment minimizes the overall thickness of the light head assembly, it is particularly well suited for installation where space, particularly depth, is a major consideration.

The present invention requires neither the use of a refracting lens nor the use of an elongated light head housing to create the desired light dispersion pattern. Rather than reliance solely upon refractance, the present invention employs a series of steps of engineered reflection to emulate, within the light head, the performance of the remote "hot" light source positioned within the light columnator. The creation of a simulated light generator mounted within the light head assembly is accomplished through the use of a relatively small, convex light deflector, this deflector being positioned close to, and facing, the discharge end of the light pipe. The deflector is optically designed to spread light which is incident thereon over substantially the entire surface of a larger, typically generally concave reflector. To form a spotlight in accordance with the present invention, the reflective surface of the concave main reflector defines, in substantial part, a paraboloid of revolution. To form a floodlight in accordance with the present invention, the reflective surface of the concave main reflector defines a surface of virtually any other shape, i.e., a plurality of paraboloids of revolution having different focal lengths. While a light transmissive lens is preferably used to support the deflector at an appropriate position relative to the main reflector and light pipe, the lens need not, but may, be formed to aid light dispersion. The deflector support may, alternatively, be some type of non-transmissive structure, such as an arm or a web, as long as the deflector is fixedly positioned to intercept light emitted from the light pipe and the support does not overly obstruct the light. A light head for use in the practice of the present invention may employ an additional reflector between the discharge end of the light pipe and the deflector to enable the light pipe to be routed substantially parallel to the plane of the surface on which the light head assembly is mounted.

The present invention also encompasses systems wherein the light columnator couples light from the source into a plurality of light pipes which are terminated in a single light head assembly. The discharge ends of the plural light pipes can either be positioned to direct light toward a single convex deflector or, optionally, can be positioned to direct light toward a plurality of optic deflectors. Regardless of the number of optic deflectors used, however, the deflectors serve to intercept light emitted from the light pipes and redirect the intercepted light toward another reflector which subsequently redirects the light into the ambient environment.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENTS

Figure 1:
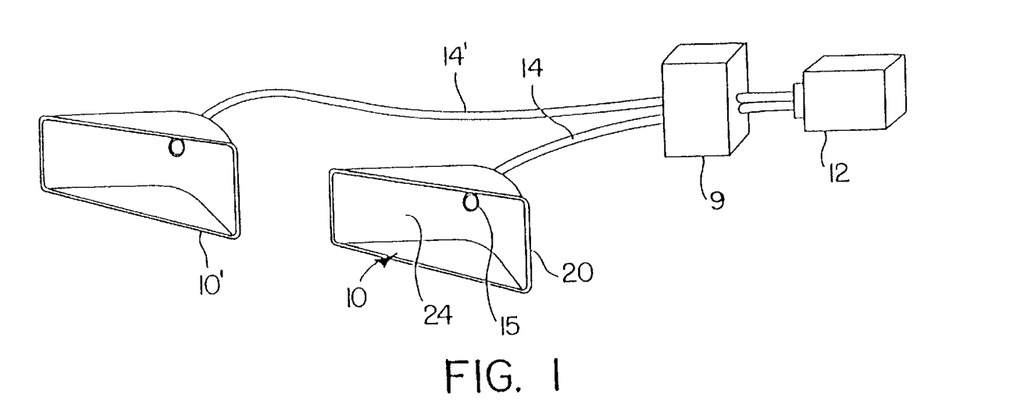
FIG. 1 is a schematic perspective view of a typical application of an illumination system in accordance with a first embodiment of the present invention, the illumination system employing a pair of light heads which are only partially shown.
Figure 2:
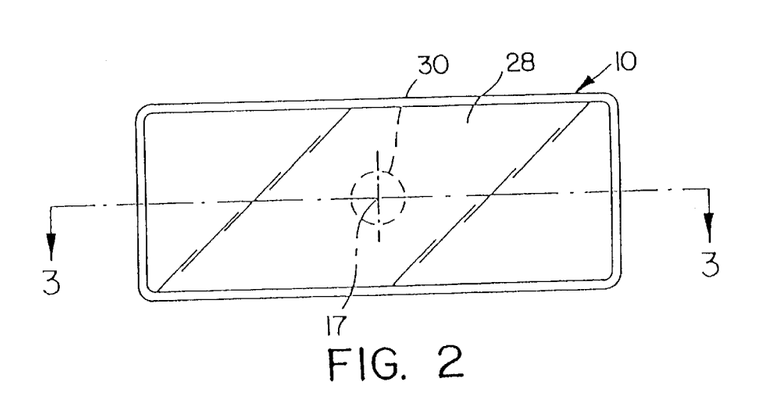
FIG. 2 is a front elevation view of one of the partially shown light heads of FIG. 1.
Figure 3:
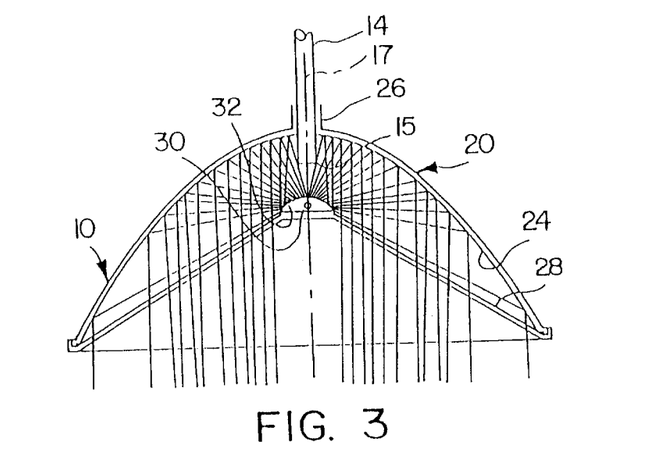
FIG. 3 is a cross-sectional schematic view of a complete light head assembly in accordance with a first embodiment of the invention.

FIG. 1 schematically illustrates an illumination system in accordance with the present invention, this system including a pair of projection devices 10 and 10', i.e., a pair of light heads. Referring jointly to FIGS. 1–3, a first embodiment of a light head assembly 10 includes at least an optic deflector 30, a main reflector 20, a support 28 for deflector 30, and means 26 for receiving a light pipe 14. Reflector 20 generally serves as the light head housing and has a reflective surface 24 on one side thereof. In the embodiment of FIGS. 1–3, deflector 30 is in the form of a convex reflector and reflective surface 24 of reflector 20 is concave and symmetric about an axis 17. The light pipe receiving means 26 is integrally formed with reflector 20 such that the discharge end 15 of light pipe 14 is oriented coaxial to axis 17 when light pipe 14 is secured within light pipe receiving means 26.

Support positions 28 deflector 30 at an appropriate distance from, and with an appropriate orientation with respect to, discharge end 15 of light pipe 14. Deflector 30 has reflective surface 32 on the side thereof which faces the end 15 of the light pipe 14. The size, position and configuration of deflector 30 are chosen to ensure that deflector 30 intercepts substantially all of the beam of light emitted from the end 15 of light pipe 14. Substantially all of the light which is incident on reflective surface 32 of deflector 30, will, in turn, be reflected toward reflector 20.

As shown in FIG. 3, support 28 can function as a light transmissive lens which cooperates with reflector 20 to define a chamber therebetween. Alternatively, support 28 can be a web-like member and a separate lens, for example a lens which defines a plane transverse to axis 17, may be provided to define the chamber if deemed necessary or desired.

The various components of light head assembly 10 can be made of a wide variety of known materials but are preferably formed of inexpensive, low temperature plastics. Reflective surfaces 24 and 32 can be formed by any of the many known methods and materials, but are preferably formed by metallizing the plastic components.

In the embodiment shown in FIGS. 1–3, light head assembly 10 is configured to function as a spotlight. Accordingly, reflective surface 24 of reflector 20 at least partially defines a paraboloid of revolution. By properly shaping and locating deflector 30 so that it encompasses the focal point of reflector 20, light redirected by deflector 30 onto reflector 20 will be redirected through lens/support 28 as rays which are oriented substantially parallel to axis 17.

In the illumination system of FIG. 1, a single remote light source 12 supplies light to multiple light pipes 14, 14', the light pipes being coupled at first ends thereof to light source 12 with the discharge ends 15 thereof terminating at respective light head assemblies 10 and 10'. Remote light source 12, which will be described in greater detail below in the discussion of FIGS. 8–10, comprises a high intensity source, a halogen lamp or a metal halide lamp for example, and a light columnator for collecting the generated light and launching it into the optical waveguides comprising light pipes 14, 14'. Each of the light pipes 14, 14' will typically consist of a bundle of solid optical fibers, a single "large" diameter optical fiber or any other optical waveguide which is functionally equivalent thereof. To illuminate an area using light head assembly 10, remote light source 12 generates light which is transmitted through light pipe 14 and emitted from discharge end 15 thereof. Reflective surface 32 of deflector 30 intercepts the light emitted from end 15 of light pipe 14 and reflects the light toward concave reflective surface 24 of reflector 20. Reflector 20 subsequently redirects the light into the ambient environment. Support 28, or a separate outwardly disposed lens, may be provided with light refracting elements for collimating and/or light passing therethrough. Thus, support 28 may cooperate with deflector 30 and reflector 20 to produce, from the small and slightly diverging light beam emitted from light pipe 14, the desired illumination pattern.

Figure 4:
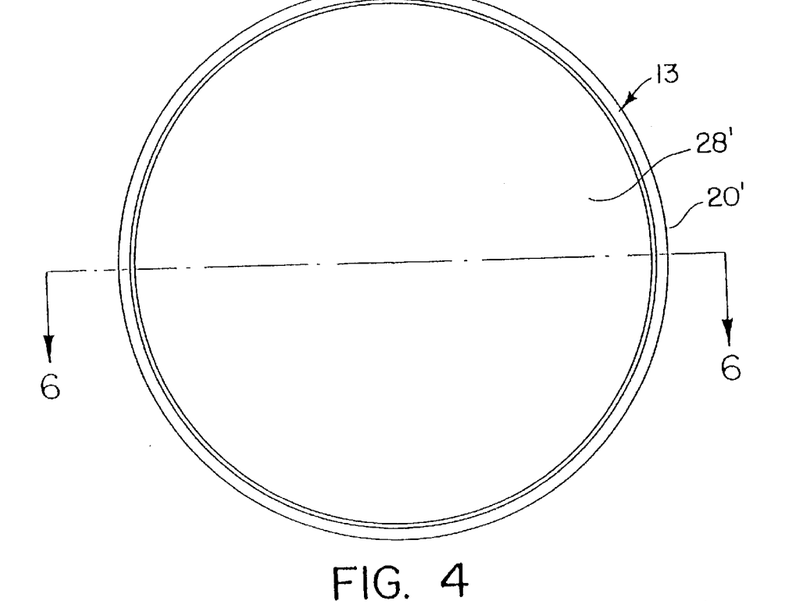
FIG. 4 is a front view of a light head assembly in accordance with another embodiment of the present invention.
Figure 5:
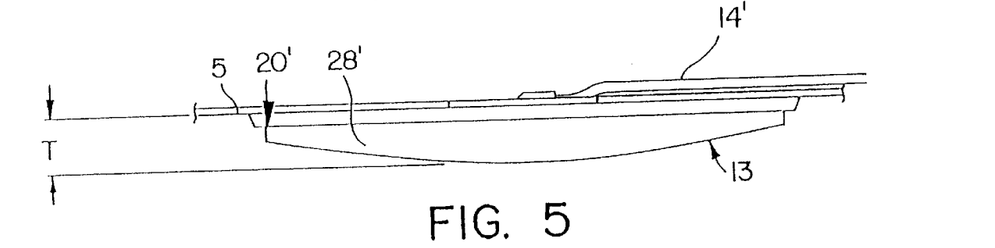
FIG. 5 is a side elevation view of the light head assembly of FIG. 4.
Figure 6:
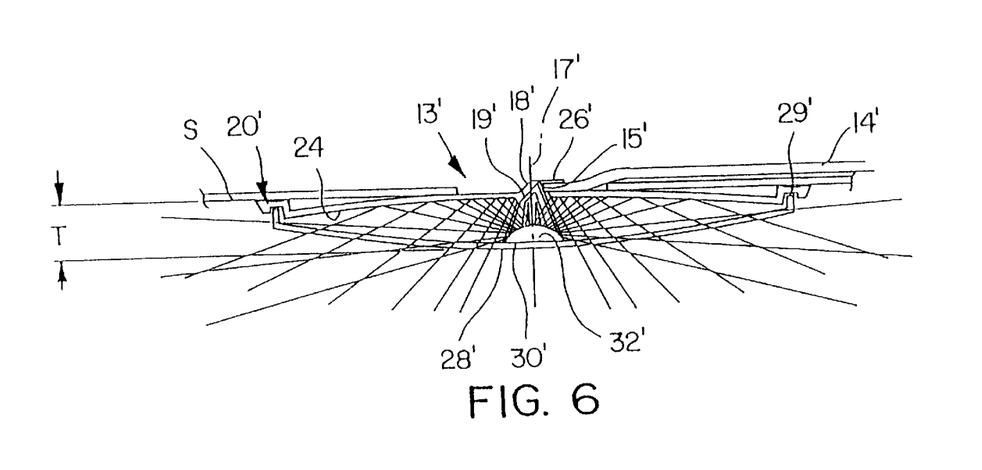
FIG. 6 is a cross-sectional schematic view, taken along line A—A of FIG. 4, of the light head assembly of FIGS. 4 and 5.

FIGS. 4–6 depict another embodiment of a light head for use in the present invention. In this embodiment the light head assembly 13 is generally similar to light head assemblies 10 and 10' shown in FIGS. 1–3. However, light head assembly 13, in addition to a deflector 30' and a reflector 20' includes a reflector 18'. In FIGS. 5 and 6, light head assembly 13 is mounted to a substantially planar support surface S. Light pipe 14' is routed to light head assembly 13 in a direction which is generally parallel to the plane of surface S, i.e., perpendicular to the axis of symmetry 17' of reflector 18' and is fixedly received within receiving member 26' of light head assembly 13. Support 28' is shown as a light transmissive lens which is mounted to reflector 20' near the perimeter thereof in any suitable manner such as, for example, by means of an adhesive bead 29'. When mounted to surface S, light head assembly 13 projects outwardly from surface S a relatively small distance, i.e., by light head thickness T.

In the embodiment of FIGS. 4–6, the reflective surface 32' of deflector 30' is generally symmetric about axis 17'. Reflector 18' has a planar reflective surface 19' on the side thereof which faces light pipe 14'. Reflective surface 19' is tilted at an angle of approximately 45° with respect to both the axis of symmetry 17' of reflector 20' and the axis of the light beam emitted from the end 15' of light pipe 14'. Due to the orientation of surface 19', light incident thereon is redirected toward reflective surface 32' of deflector 30'. Reflective surface 32' subsequently redirects the light in the form of diverging light rays toward reflective surface 24' of reflector 20'. The light intercepted by reflective surface 24' is then redirected into the ambient environment. In the embodiment of FIGS. 4–6, reflective surface 24' of reflector 20' will be shaped, in the manner known in the art, to produce wide angle illumination. Thus, light reflected toward the ambient environment by reflective surface 24' is particularly well suited for use as a scene light, i.e., to provide wide area illumination. Such a light may, for example, be employed to illuminate the interior of an ambulance. Since the overall thickness of light head assembly 13 is generally much less than the overall thickness of previously available light head assemblies, this embodiment is well suited for shallow mounting applications such as in the head liner of a vehicle.

As shown in the figures, deflector 30 will preferably be sized to eclipse the light source, i.e., to intercept substantially all of the light beam which enters the "chamber" defined in part by reflector 20. In actual practice at least ninety percent (90%) of the light emitted from the end of the light pipe 14 will be incident upon deflector 30. When the reflector 20 has an axis of symmetry, that axis will typically pass through deflector 30 and the focal point(s) F of the primary reflector will typically be coincident with one another and lie on the axis. Thus, the diverging light reflected from surface 32 of deflector 30 will appear to reflector 20 as light being emitted from a source, for example the filament of a lamp, located at the common focal point of reflector 20.

Since the presence of deflector 30 interferes with some of the light reflected by reflector 20, thereby creating a dead spot in the illumination pattern, it may in some applications be preferable to minimize the size of the deflector 30. This can be accomplished by placing deflector 30 close to the discharge end 15 of light pipe 14 and designing reflective surface 32 of deflector 30 to provide a wide angle of dispersion. Alternatively, deflector 30 may be provided with one or more transparent regions through which light may pass, i.e., deflector 30 may also function as a lens through which a portion of the light emitted from discharge end 15 of light pipe 14 may pass.

Figure 7:
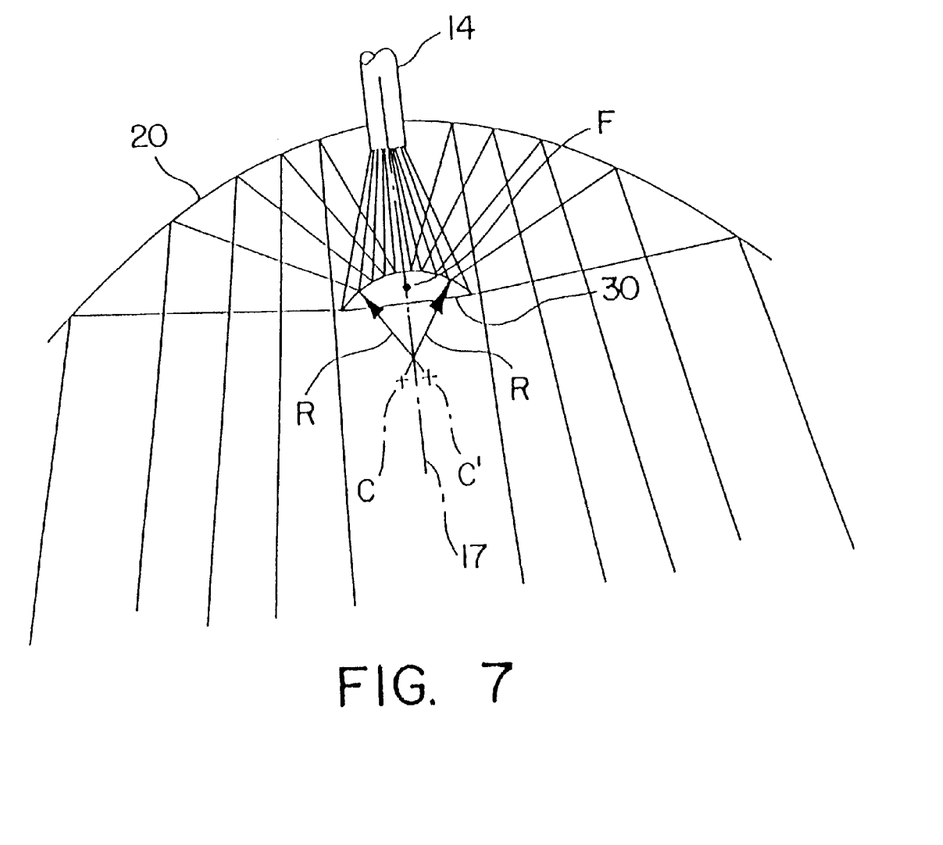
FIG. 7 is an enlarged view which depicts details of a preferred embodiment of an optic deflector for use in the present invention.

The shape of reflective surface 32 will be determined by the particular light dispersion pattern desired and thus will be a function of the shape of the primary reflector and the position of the deflector relative to the source, i.e., the end of the light pipe or the additional mirror 30'. For example, to form a scene light in accordance with a preferred embodiment of the present invention, deflector 30 is preferably positioned close to the central aperture in reflector 20 and reflective surface 32 is symmetric about axis 17. Referring to FIG. 7, in one reduction to practice surface 32 was a composite of at least two convex surfaces having the same radius R, but with different points of origin C, C', these points of origin being displaced from axis 17. One or more deflectors 30 can be positioned off-center with respect to axis of symmetry 17 of reflective surface 24 and receive light from one or more light pipes 14. In such a case each reflective surface 32 of each deflector 30 will preferably be asymmetric to assure light distribution over substantially the entire reflective surface 24.

The present invention can also be used in conjunction with a device for interrupting and/or colorizing the source light. Referring again to FIG. 1, the interruption device 9 is located along the length of light pipes 14 and 14' and operates on the light as it travels from remote light source 1 2 toward light heads 10 and 10'. The interruption device, which for example can be a color wheel or "chopper", periodically interrupts the light travelling through light pipes 14 and 14' either alternately or simultaneously. The resulting effect is that light heads 10 and 10' periodically flash to simulate strobe lights such as those widely used in emergency vehicles.

Figure 8:
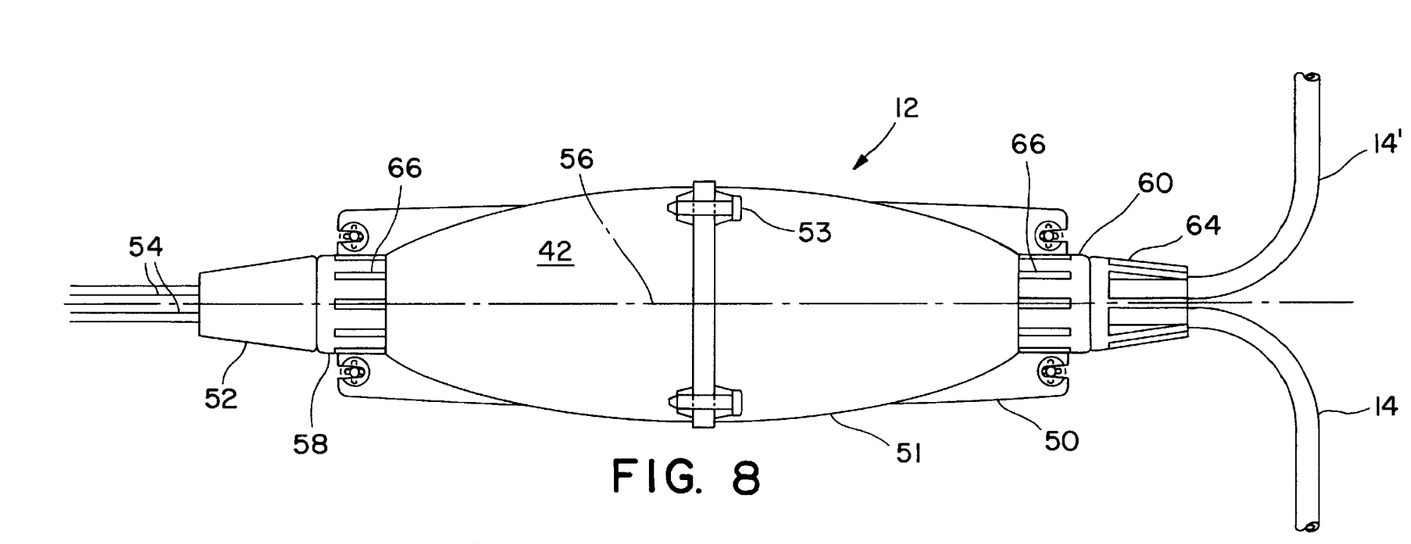
FIG. 8 is a top view of a light coupler in accordance with the invention.
Figure 9:
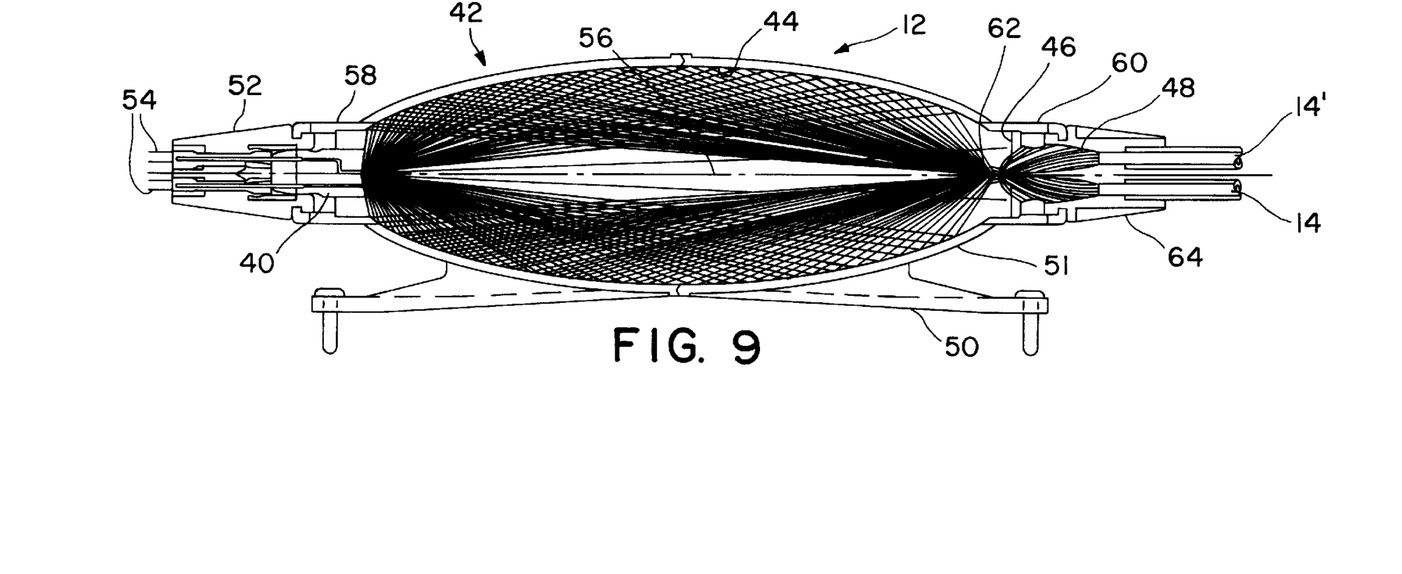
FIG. 9 is a cross-sectional side elevation view of the coupler of FIG. 8, FIG. 9 including a ray trace showing which explains the operation of the coupler.
Figure 10:
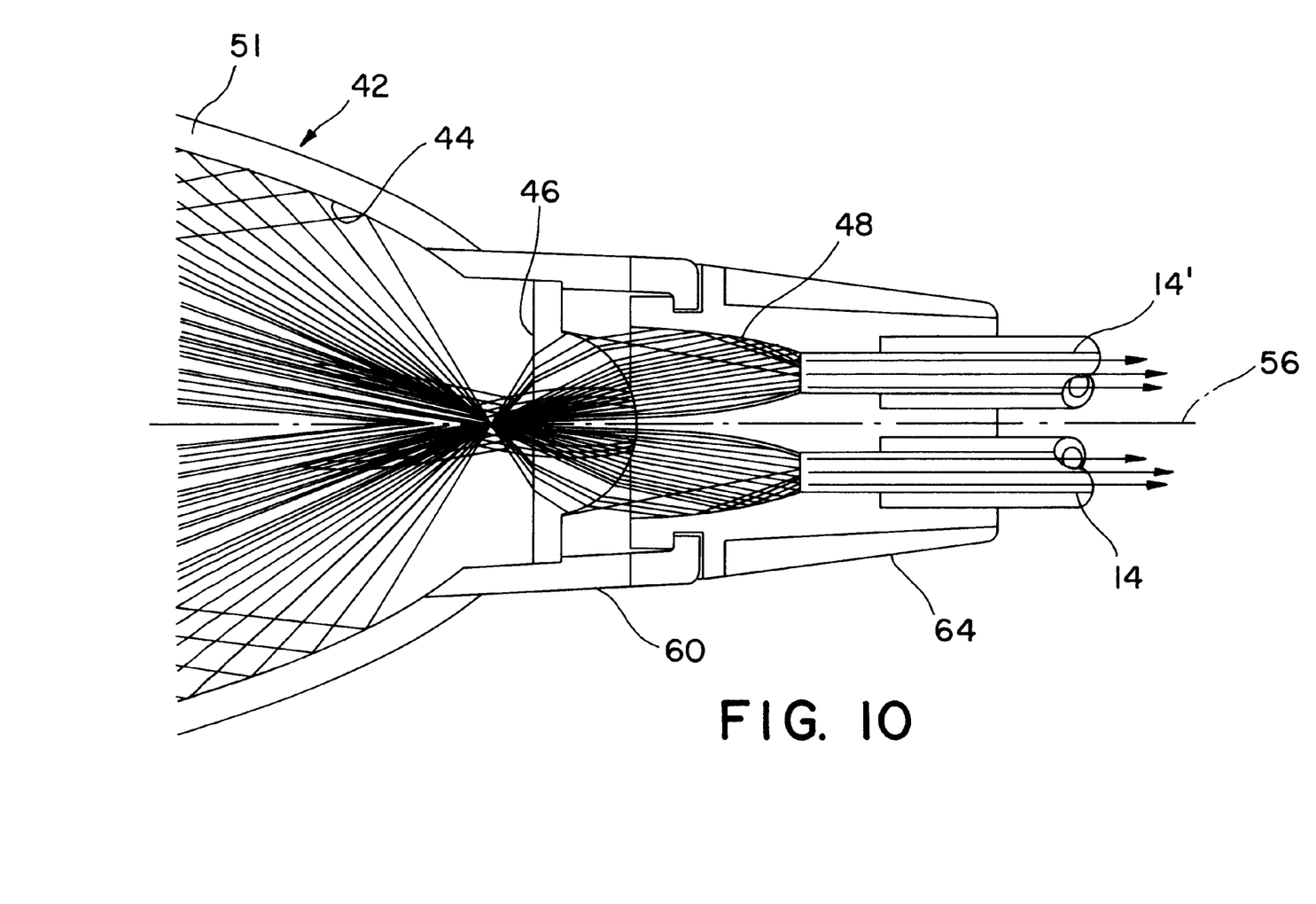
FIG. 10 is an enlarged cross-sectional view, taken in the same direction as FIG. 9, which provides further details of the discharge end of the coupler.

Referring now to FIGS. 8–10, a preferred embodiment of a light source 12 for use in the practice of the present invention includes a light generator, indicated at 40 in FIG. 9, and a light columator, indicated generally at 42, for coupling light produced by generator 40 into light pipes 14 and 14'. The principal components of columnator 42 are a primary reflector 44, a piano-convex lens 46 and a secondary reflector 48. The light source 12, when assembled, comprises a unitary structure which may be mounted to a surface by means of an mounting base 50 which is integral with a housing 51, the housing defining primary reflector 44.

The light generator 40, in the disclosed embodiment, is a halogen lamp which is supported in a first connector 52. Connector 52 is releasably engageable with housing 51. The electrical conductors 54 for supplying energizing current to light generator 40 pass through the base of connector 52 and are connected to the terminals of a socket which releasably receives light generator 40, the socket being permanently disposed in connector 52.

The primary reflector defining housing 51 is formed of two halves which are held together by fasteners 53 as clearly shown in FIG. 8. Reflector 44 has an ellipsoid shape and therefore defines a pair of spacially separated foci located on a common central axis 56. Each half of housing 51 further defines a receiver for a removable connector. These receivers, indicated at 58 and 60, are coaxial and oppositely disposed. Receivers 58 and 60 are also coaxial with axis 56. Receiver 58 and its cooperating connector 52 are dimensioned such that, when the light source 12 is assembled, the filament of lamp 40 will be positioned so as to intercept a first focal point of reflector 44. Accordingly, as indicated by the ray traces on FIGS. 9 and 10, substantially all of the light emitted by lamp 40 will, because of the ellipsoidal shape of primary reflector 44, be focused at the second focal point 62 thereof.

The plano-convex lens 46 is mounted in receiver 60 so as to be displaced from focal point 62. In the disclosed embodiment, the spacing between the lamp filament and lens is greater than the distance between the foci of reflector 44. Lens 46 is preferably comprised of pressed glass. The location of lens 46 away from focal point 62 protects the lens against thermal damage, i.e., the light energy is concentrated at a point in space rather than in an optical element. Lens 46 is sized so that substantially all of the light incident thereon will pass through, and be redirected by, the downstream facing the convex portion thereof. A substantial portion of the light thus focused by lens 46 will fall on the ends of the light pipes 14 and 14' at an angle which is within the acceptance angle of the optical fibers.

The optical fibers 14 and 14' are supported in a second connector 64 which, like connector 52, releasably engages housing 51 via receiver 60. As may best be seen from FIG. 10, the secondary reflector 48 is integral with connector 64. Secondary reflector 48 defines a portion of a paraboloid of revolution about axis 56. A substantial portion of the light which is incident on lens 46 at angles too great to enable redirection by the lens and subsequent launching along the light pipes will be incident on secondary reflector 48. Most of the light incident on secondary reflector 48 will, because of the parabolic shape thereof, be redirected to the ends of the light guides 14, 14' at angles which are within the acceptance angles thereof.

To summarize the above, a very high percentage of the light emanating from lamp 40 will, through the combined action of the ellipsoidal primary reflector 44, the plano-convex lens 46 and the parabolic secondary reflector 48, be launched along the light guides supported in connector 64, the light guides being supported in the connector such that the entrance ends thereof are coaxial with the axis 56 of the primary reflector 44. The light columnator 42 is thus more efficient at utilizing the available light energy, when compared to the prior art, while simultaneously being volumetrically efficient and economical to construct.

Referring to FIG. 8, both of receivers 58 and 60 are provided with slots 66 to achieve convective cooling of the lamp 40 and the lens 46.

The housing 51 which defines primary reflector 44 may be comprised of a high temperature plastic which has its inner surfaces metalized by, for example, the vacuum deposition of aluminum thereon. Alternatively, the two halves of housing 51 may be comprised of electroformed metal and manufactured in the manner described in co-pending application Ser. No. 08/824,287. The connector 52 may be comprised of a suitable ceramic or may be in the form of a ceramic lamp holder mounted in a molded plastic holder. The connector 64 will typically be molded from high temperature plastic and the surface thereof which defines the parabolic reflector 48 will be metalized.

It is to be understood that the invention is not limited to the illustrations described and shown herein. It will be readily appreciated by those of ordinary skill in the art that the invention is susceptible of modification of form, size, arrangement of parts and details of operation. The invention is thus intended to encompass all such modifications which are within the scope and spirit of the appended claims.

What is claimed is:

1. Apparatus for coupling light emitted by a light generator into an optical waveguide comprising:
   a primary reflector, said primary reflector having an axis and a pair of displaced foci lying on said axis, said primary reflector defining a cavity which is coaxial with said axis, said cavity being open at least at a first end, said open first end of said cavity being coaxial with said axis;
   a support for a light generator, said support positioning a light generator at a first of said foci of said primary reflector;
   a holder for an optical waveguide, said optical waveguide having an entrance end and an axis, said holder locating said waveguide in registration with said primary reflector open first end with said axis of said waveguide entrance end being oriented parallelly with respect to said axis of said primary reflector;
   a lens positioned between said open first end of said primary reflector and said first foci thereof, said lens having an axis and being oriented coaxially with respect to said axis of said primary reflector, said lens being spatially displaced from the second of said foci of said primary reflector, said lens being sized and positioned to intercept light reflected by said primary reflector, said lens redirecting intercepted light, light which is incident on said lens at angles which are less than a predetermined angle being directed to said entrance end of said waveguide and entering said waveguide at angles which are within the acceptance angle thereof; and
   a secondary reflector positioned between said lens and said waveguide entrance end, said secondary reflector being coaxial with said axis of said primary reflector, light incident on said lens at angles greater than said predetermined angle being redirected by said lens to said secondary reflector, said secondary reflector redirecting light incident thereon to said waveguide entrance end, light reflected to said waveguide entrance end by said secondary reflector entering said waveguide at angles which are within the acceptance angle thereof.

2. The apparatus of claim 1 wherein said primary reflector has a reflective surface which defines an ellipsoid.

3. The apparatus of claim 1 wherein said secondary reflector has a reflective surface which defines a portion of a paraboloid of revolution about said axis of said primary reflector.

4. The apparatus of claim 1 wherein said lens is a plano-convex lens, light energy reflected from said primary reflector being incident on the planar side of said lens.

5. The apparatus of claim 1 wherein said cavity defined by said primary reflector is open at a second end disposed oppositely with respect to said first end, said open second end being coaxial with said open first end, said support extending into said primary reflector through said open second end.

6. The apparatus of claim 1 wherein said secondary reflector is integral with said holder.

7. The apparatus of claim 1 wherein said lens is positioned between said second foci of said primary reflector and said secondary reflector.

8. The apparatus of claim 1 wherein said light generator produces heat as a by-product of the emission of light.

9. The apparatus of claim 1 wherein said support and said holder are releasably engageable with said primary reflector.

10. The apparatus of claim 5 further comprising:
    means defining a path for the flow of a cooling gas through said reflector in the region of said open second end thereof.

11. The apparatus of claim 2 wherein said secondary reflector has a reflective surface which defines a portion of a paraboloid of revolution about said axis of said primary reflector.

12. The apparatus of claim 11 wherein said lens is a piano-convex lens, light energy reflected from said primary reflector being incident on the planar side of said lens.

13. The apparatus of claim 12 wherein said lens is positioned between said second foci of said primary reflector and said secondary reflector.

14. The apparatus of claim 13 wherein said support and said holder are releasably engageable with said primary reflector.

15. The apparatus of claim 14 wherein said secondary reflector is integral with said holder.

16. The apparatus of claim 15 wherein said cavity defined by said primary reflector is open at a second end disposed oppositely with respect to said first end, said open second end being coaxial with said open first end, said support extending into said primary reflector through said open second end.

17. The apparatus of claim 16 further comprising:
   means defining a path for the flow of a cooling gas through said reflector in the region of said open second end thereof.

18. An illumination system for creating a desired light dispersion pattern, said system comprising:
   a light generator;
   an optical waveguide for transmitting light emitted by said light generator, said optical waveguide having oppositely disposed entrance and discharge ends and an axis, light being discharged from said waveguide discharge end as a diverging beam;
   a light head, said light head including:
      a reflector, said reflector having a concave reflective surface and redirecting light incident thereon to at least in part produce said desired light dispersion pattern;
      means for coupling said waveguide discharge end to said light head reflector, said coupling means causing said diverging beam to be directed away from said concave reflective surface; and
      means for emulating a source of the light to be redirected by said light head reflector to produce said desired light dispersion pattern, said light source emulating means including a convex reflective surface and being positioned to substantially eclipse said diverging beam discharged from said waveguide, light rays comprising said eclipsed beam being redirected by said emulating means so as to be incident on said concave reflective surface; and
   means for collimating light emitted by said light generator and directing said collimated light into said entrance end of said optical waveguide, said collimating means comprising:
      a primary three-dimensional reflector, said collimating means primary reflector having an axis and defining a cavity which is coaxial with said axis, said cavity being open at least at a first end, said open first end of said cavity being coaxial with said primary reflector axis;
      a support for said light generator, said light generator support positioning said light generator whereby the light emitted thereby will be discharged into said primary reflector defined cavity;
      a holder for said optical waveguide, said holder locating said waveguide entrance end in registration with said primary reflector open first end and orienting said axis of said waveguide entrance end parallelly with respect to said axis of said collimating means primary reflector;
      a lens, said lens having an axis and being oriented coaxially with respect to said axis of said collimating means primary reflector, said lens being sized and positioned to intercept light reflected by said primary reflector, light which is incident on said lens at angles which are less than a predetermined angle being directed to said entrance end of said waveguide and entering said waveguide at angles which are within the acceptance angle thereof; and
      a three-dimensional secondary reflector positioned between said lens and said waveguide entrance end, said collimating means secondary reflector being coaxial with said axis of said primary reflector, said secondary reflector having a shape which is dissimilar from the shape of said first reflector, light incident on said lens at angles greater than said predetermined angle being redirected by said lens to said secondary reflector, said secondary reflector redirecting light incident thereon to said waveguide entrance end, light reflected to said waveguide entrance end by said secondary reflector entering said waveguide at angles which are within the acceptance angle thereof.

19. The apparatus of claim 18 wherein at least part of said concave reflective surface of said light head reflector defines a paraboloid of revolution and wherein said light source emulating means comprises:
   an optical deflector, said deflector being substantially smaller in size than said light head reflector; and
   means for supporting said deflector in spaced relation to said light head reflector concave reflective surface.

20. The apparatus of claim 19 wherein said collimating means primary reflector has a reflective surface which defines an ellipsoid having a pair of displaced foci lying on said primary reflector axis, and said light generator support positions said light generator at a first of said foci of said primary reflector, said lens being positioned between said open first end of said primary reflector and said first foci thereof and being spatially displaced from the second of said foci of said primary reflector.

21. The apparatus of claim 20 wherein said collimating means secondary reflector includes a reflective surface which defines a portion of a paraboloid of revolution about an axis which is substantially coaxial with the axis of said waveguide at said entrance end thereof.

* * * * *

UNITED STATES PATENT AND TRADEMARK OFFICE
CERTIFICATE OF CORRECTION

PATENT NO. : 6,226,440 B1
DATED : May 1, 2001
INVENTOR(S) : Lyons

It is certified that error appears in the above-identified patent and that said Letters Patent is hereby corrected as shown below:

<u>Column 10,</u>
Line 60, delete "piano-convex" and insert -- plano-convex --.

Signed and Sealed this

Twenty-third Day of July, 2002

Attest:

Attesting Officer

JAMES E. ROGAN
*Director of the United States Patent and Trademark Office*